(12) United States Patent
Ferrer

(10) Patent No.: US 10,502,866 B2
(45) Date of Patent: Dec. 10, 2019

(54) SYSTEMS AND METHODS FOR SIMULATING TIME PHASED SOLAR IRRADIANCE PLOTS

(71) Applicant: The Boeing Company, Seal Beach, CA (US)

(72) Inventor: Alberto Ferrer, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 747 days.

(21) Appl. No.: 14/160,867

(22) Filed: Jan. 22, 2014

(65) Prior Publication Data

US 2015/0205008 A1    Jul. 23, 2015

(51) Int. Cl.
*G01W 1/12* (2006.01)
*G01W 1/10* (2006.01)

(52) U.S. Cl.
CPC ............... *G01W 1/12* (2013.01); *G01W 1/10* (2013.01)

(58) Field of Classification Search
CPC .................................... G01W 1/10; G01W 1/12
See application file for complete search history.

(56) References Cited

U.S. PATENT DOCUMENTS

| | | | |
|---|---|---|---|
| 7,048,204 B1 | 5/2006 | Addink et al. | |
| 7,580,817 B2 | 8/2009 | Bing | |
| 7,832,267 B2 | 11/2010 | Woro | |
| 8,280,799 B2 | 10/2012 | Bing | |
| 8,841,592 B1 | 9/2014 | Ho et al. | |
| 2009/0279734 A1* | 11/2009 | Brown | G06K 9/0063 382/100 |
| 2010/0085360 A1* | 4/2010 | Ren | G06T 15/50 345/426 |
| 2012/0191351 A1 | 7/2012 | Kerrigan et al. | |
| 2013/0018532 A1 | 1/2013 | Segal et al. | |

(Continued)

FOREIGN PATENT DOCUMENTS

WO    2013181408 A2    12/2013

OTHER PUBLICATIONS

Guzman et al., Daily Rainfall Probabilities: Conditional upon Prior Occurrence and Amount of Rain, Oct. 1985, American Meteorological Society, Journal of Climate and Applied Meteorology, 1009-1014.*

(Continued)

*Primary Examiner* — Janet L Suglo
(74) *Attorney, Agent, or Firm* — Armstrong Teasdale LLP

(57) ABSTRACT

A method for calculating solar irradiance over a predetermined time period for a geographical area including a plurality of geographical points is described. The method is implemented by a computing device coupled to a weather database. The method includes receiving a first identifier corresponding to a beginning of the predetermined time period and a second identifier corresponding to an ending of the predetermined time period, receiving weather data from the weather database, generating a model of diffuse light and atmosphere attenuation, based at least on the first identifier, the second identifier, and the weather data, determining solar parameters, and determining an amount of solar irradiance for each geographical point for each of a plurality of time intervals within the predetermined time period, based at least on the model and the solar parameters.

12 Claims, 6 Drawing Sheets

(56) References Cited

U.S. PATENT DOCUMENTS

| | | |
|---|---|---|
| 2013/0152997 A1 | 6/2013 | Yao et al. |
| 2013/0152998 A1 | 6/2013 | Herzig et al. |
| 2013/0166266 A1 | 6/2013 | Herzig et al. |
| 2013/0226537 A1 | 8/2013 | Jee et al. |
| 2014/0016121 A1 | 1/2014 | MacDonald |

OTHER PUBLICATIONS

Click et al., "Effects of Solar Resource Variability on the Future Florida Transmission and Distribution System," 2012, IEEE, pp. 1-7.*

Huang et al., "Comparative Study of Power Forecasting Methods for PV Stations," 2010, IEEE, pp. 1-6.*

Naing et al., "Estimation of Solar Power Generating Capacity," 2010, IEEE, pp. 95-100.*

Schilllings et al., Operational method for deriving high resolution direct normal irradiance from satellite data, Solar Energy, dated Apr. 1, 2004, pp. 475-484, vol. 76, No. 4.

European Search Report for application No. 15151511.1, dated May 19, 2015, pp. 7.

\* cited by examiner

SYSTEMS AND METHODS FOR SIMULATING TIME PHASED SOLAR IRRADIANCE PLOTS

BACKGROUND

The present disclosure relates generally to calculating solar irradiance for a geographic area, and more particularly to systems and methods for simulating time phased solar irradiance plots.

Known systems for calculating an amount of solar irradiance for a geographical location are limited to calculating the solar irradiance for a fixed geographical point and a fixed instant in time. Typically, such systems output the calculated irradiance as a text-based string representation, rather than a graphical representation. Moreover, such systems typically do not incorporate data pertaining to weather conditions in calculating the solar irradiance. Given that known systems are limited to calculating solar irradiance for a fixed geographical point and a fixed instant in time, do not take into account weather conditions, and do not provide a graphical representation of the calculated solar irradiance, a system that overcomes such limitations would be beneficial.

BRIEF DESCRIPTION

In one aspect, a method for calculating solar irradiance over a predetermined time period for a geographical area including a plurality of geographical points is provided. The method is implemented by a computing device coupled to a weather database. The method includes receiving a first identifier corresponding to a beginning of the predetermined time period and a second identifier corresponding to an ending of the predetermined time period, receiving weather data from the weather database, generating a model of diffuse light and atmosphere attenuation, based at least on the first identifier, the second identifier, and the weather data, determining solar parameters, and determining an amount of solar irradiance for each geographical point for each of a plurality of time intervals within the predetermined time period, based at least on the model and the solar parameters.

In another aspect, a computing device for calculating solar irradiance over a predetermined time period for a geographical area including a plurality of geographical points is provided. The computing device is coupled to a weather database. The computing device is configured to receive a first identifier corresponding to a beginning of the predetermined time period, receive a second identifier corresponding to an ending of the predetermined time period, receive weather data from the weather database, generate a model of diffuse light and atmosphere attenuation, based at least on the first identification, the second identification, and the weather data, determine solar parameters, and determine an amount of solar irradiance for each geographical point for each of a plurality of time intervals within the predetermined time period, based at least on the model and the solar parameters.

In another aspect, a computer-readable storage medium having computer-executable instructions embodied thereon for calculating solar irradiance over a predetermined time period for a geographical area, including a plurality of geographical points, is provided. When executed by a computing device coupled to a weather database and having at least one processor, the computer-executable instructions cause the computing device to receive a first identifier corresponding to a beginning of the predetermined time period, receive a second identifier corresponding to an ending of the predetermined time period, receive weather data from the weather database, generate a model of diffuse light and atmosphere attenuation, based at least on the first identification, the second identification, and the weather data, determine solar parameters, and determine an amount of solar irradiance for each geographical point for each of a plurality of time intervals within the predetermined time period, based at least on the model and the solar parameters.

DETAILED DESCRIPTION

Figure 1:
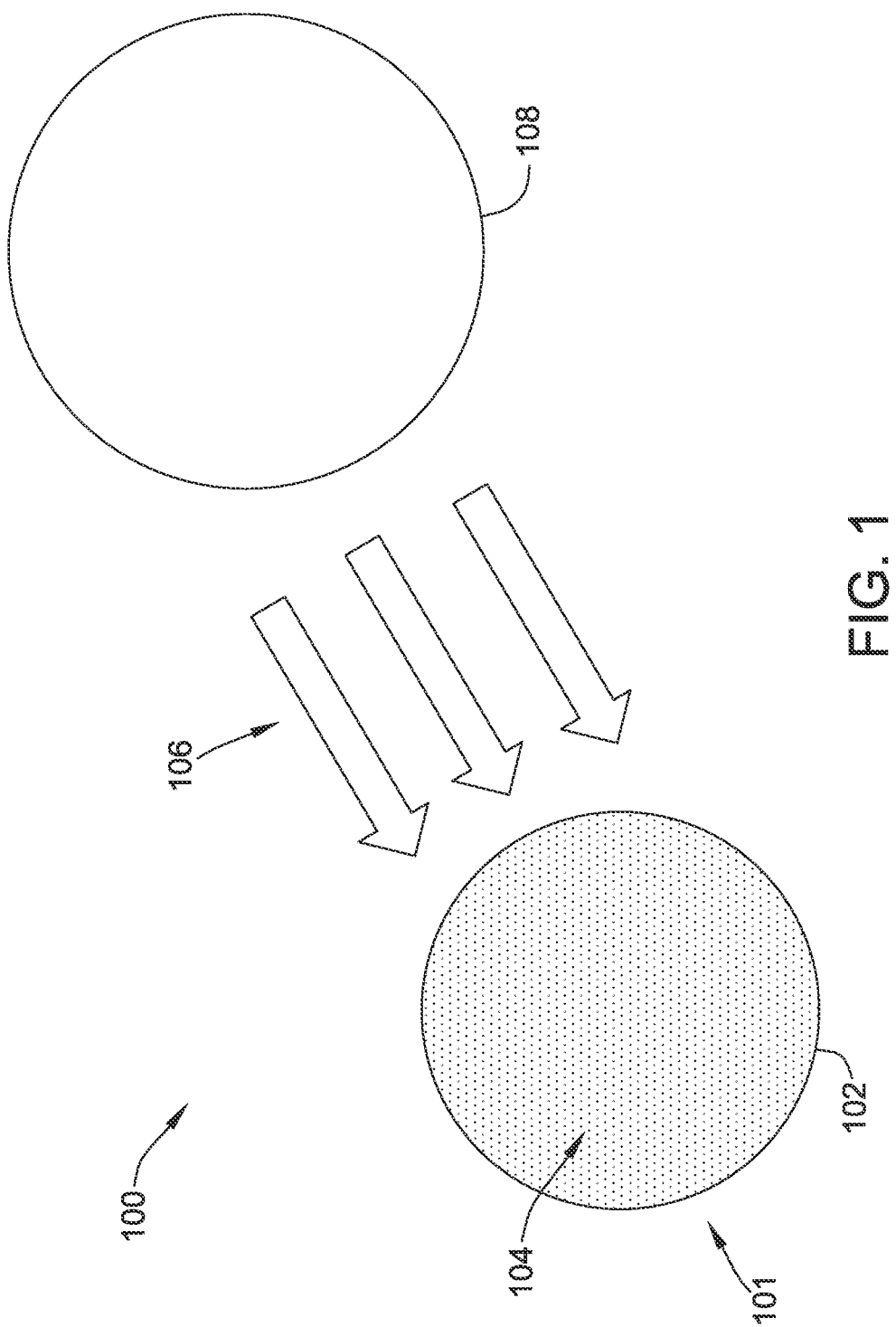
FIG. 1 is a simplified diagram of an example environment in which a geographical area having a plurality of geographical points receives solar irradiance.

FIG. 1 is a simplified diagram of an example environment 100 in which a geographical area 102 having a plurality of geographical points 104 receives solar irradiance 106. Solar irradiance 106 is generated by Sun 108. Geographical area 102 is all or a portion of a surface or area above the surface of a planet 101 (e.g. Earth). Each of geographical points 104 may receive a different amount of solar irradiance 106 during a given time period, for example a 24-hour period. Factors that may affect an amount of solar irradiance 106 received at a geographical point 104 include the location of geographical point 104 relative to Sun 108, time of day, time of year, weather conditions, and an altitude of geographical point 104. More specifically, geographical point 104 is not necessarily on the surface of planet 101, but rather may be at a given elevation above the surface.

Figure 2:
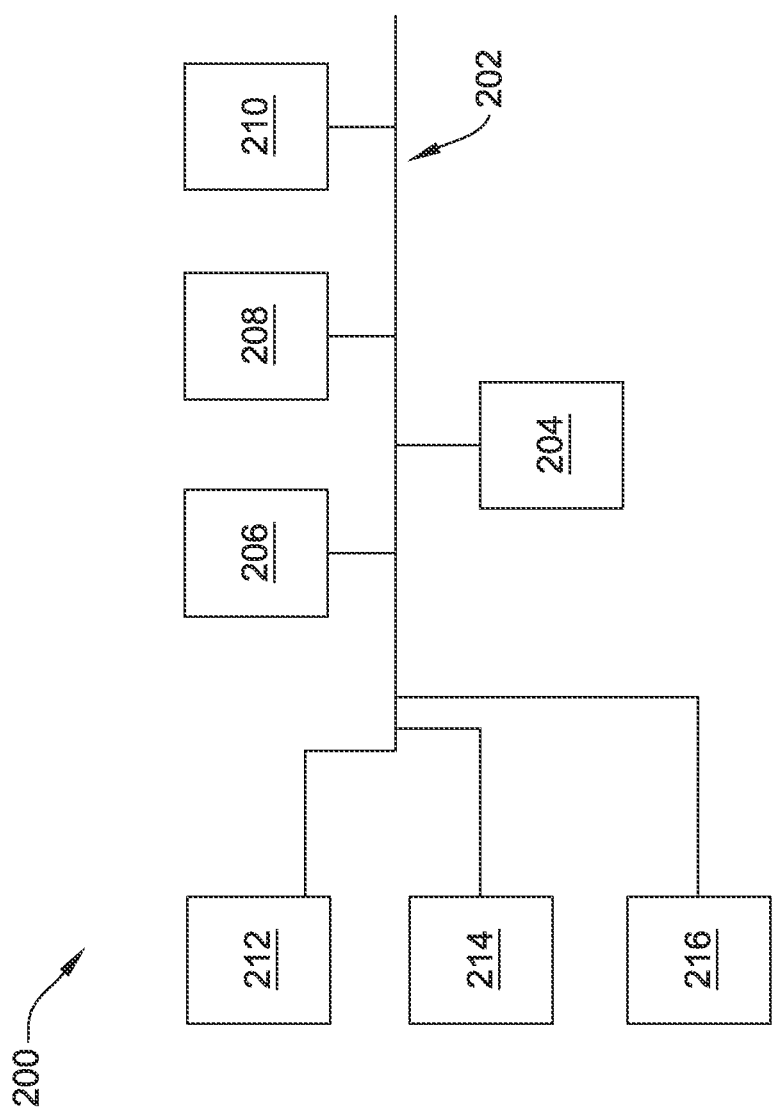
FIG. 2 is a block diagram of an example computing device that may calculate an amount of solar irradiance over a predetermined time period for the geographical area.

FIG. 2 is a block diagram of an example computing device 200 that may calculate an amount of solar irradiance over a predetermined time period for a geographical area (e.g., a plurality of geographical points 104). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive. In some implementations, storage device 210 includes a weather database 312 (FIG. 3) described in more detail herein.

Input device 212 may include a conventional mechanism that permits computing device 200 to receive commands, instructions, or other inputs from a user, including visual, audio, touch, button presses, stylus taps, etc. Additionally, input device may receive location information. Accordingly, input device 212 may include, for example, a camera, a microphone, one or more buttons, and/or a touch screen. Output device 214 may include a conventional mechanism that outputs information to a user, including a display (including a touch screen) and/or a speaker. Communication interface 216 may include any transceiver-like mechanism that enables computing device 200 to communicate with other devices and/or systems. For example, communication interface 216 may include mechanisms for communicating with another computing device.

As described herein, computing device 200 facilitates calculating solar irradiance 106 over a predetermined time period for geographical area 102. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 3:
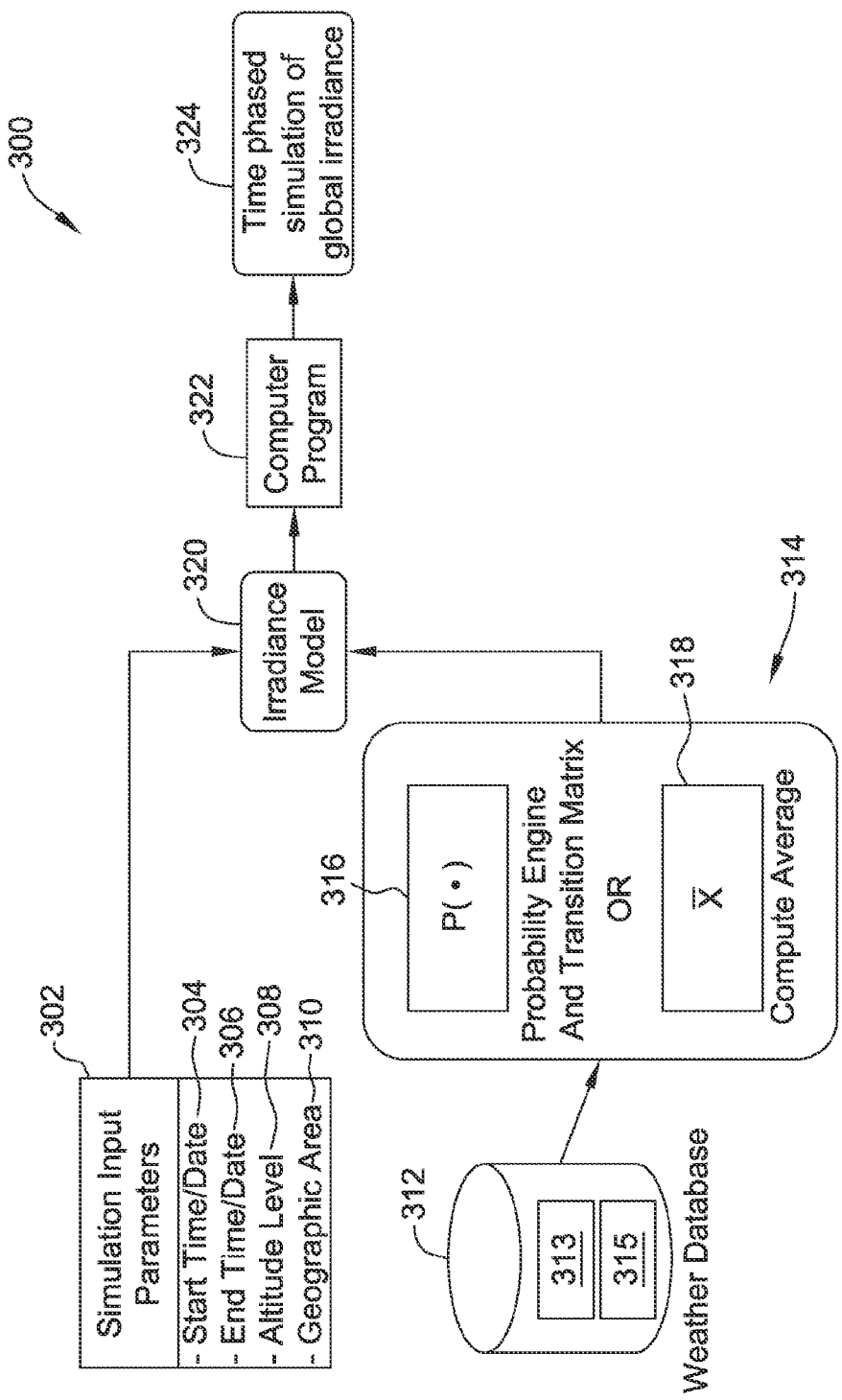
FIG. 3 is a block diagram of an example data flow that may be used for calculating the amount of solar irradiance over the predetermined time period for the geographical area.

FIG. 3 is a block diagram of an example data flow 300 that may be used for calculating the amount of solar irradiance 106 over the predetermined time period for geographical area 102 (FIG. 1). Input parameters 302 provided to computing device 200 include a first identifier 304 corresponding to a beginning of the predetermined time period, a second identifier 306 corresponding to an ending of the time period, and, in some implementations, a third identifier 308 corresponding to an altitude. In some implementations, input parameters 302 additionally include a fourth identifier 310 corresponding to the geographical area for which computing device 200 is to calculate the amount of solar irradiance 106 received over the predetermined time period. In other implementations, input parameters 302 do not include fourth identifier 310. Rather, in such implementations, geographical area 102 includes all geographical points 104 of planet 101. First identifier 304 may be, for example, a date and/or time. Likewise, second identifier 306 may be a later date and/or time. Third identifier 308 may be, for example, a number of feet above sea level, or any other indication of altitude. Computing device 200 may receive input parameters 302 through input device 212 and/or through communication interface 216, for example from another computing device (not shown) in communication with computing device 200.

Computing device 200 additionally receives weather data from a weather database 312 for geographical area 102. Weather database 312 may include historical weather data 313 and/or current weather data 315. In some implementations, historical weather data 313 and current weather data 315 is obtained from one or more global weather stations (not shown). Computing device 200 parses weather data 313 and 315 from weather database 312 to generate a weather and atmosphere attenuation model 314. More specifically, computing device 200 generates weather and atmosphere attenuation model 314 by applying a probability engine and transition matrix 316 (i.e., a probability generating function) to determine a probability or percentage chance of one or more weather events occurring in one or more geographical points 104 of geographical area 102, at a particular altitude or range of altitudes, during all or a portion of the predetermined time period specified by input parameters 302. The weather events may include rain, clouds, and/or other events that may affect an amount of solar irradiance 106 received at the one or more geographical points 104. In other implementations, computing device 200 generates weather and atmosphere attenuation model 314 by determining an average 318 for weather conditions for the one or more geographical points 104 in geographical area 102. For example, for a given day of a month, computing device 200 may retrieve, from weather database 312, weather conditions for each of the one or more geographical points 104 for multiple previous years and calculate an average weather 318 for each geographical point 104. In some implementations, computing device 200 assigns weights to weather data 313 and 315 from weather database 312, such that older weather data is weighted less heavily than more recent weather data, in calculating weather and atmosphere attenuation model 314.

Additionally, computing device 200 generates or calculates an irradiance model 320 based at least in part on input parameters 302 and weather and atmosphere attenuation model 314. More specifically for each geographical point 104, computing device 200 calculates solar parameters including an azimuth, a declination, an hour angle, and a solar time. Additionally, computing device 200 combines the solar parameters with weather and atmosphere attenuation model 314 to determine an amount of solar irradiance 106 received at each geographical point 104. More specifically, by combining weather and atmosphere attenuation model 314 with the solar parameters, computing device 200 determines an amount of solar irradiance received at each geographical point 104 under weather conditions that may attenuate or decrease an amount of solar irradiance 106 that would otherwise be received at each geographical point 104 under clear sky conditions.

Additionally, computing device 200 executes a computer program 322 (i.e., computer-executable instructions) that causes computing device 200 to generate a time-phased simulation 324 of solar irradiance 106 received in geographical area 102. As described herein, in some implementations, time-phased simulation 324 is an animation. In some implementations, time-phased simulation 324 may be a time-phased simulation of global irradiance if geographical area 102 includes all geographical points 104 on planet 101.

Figure 4:
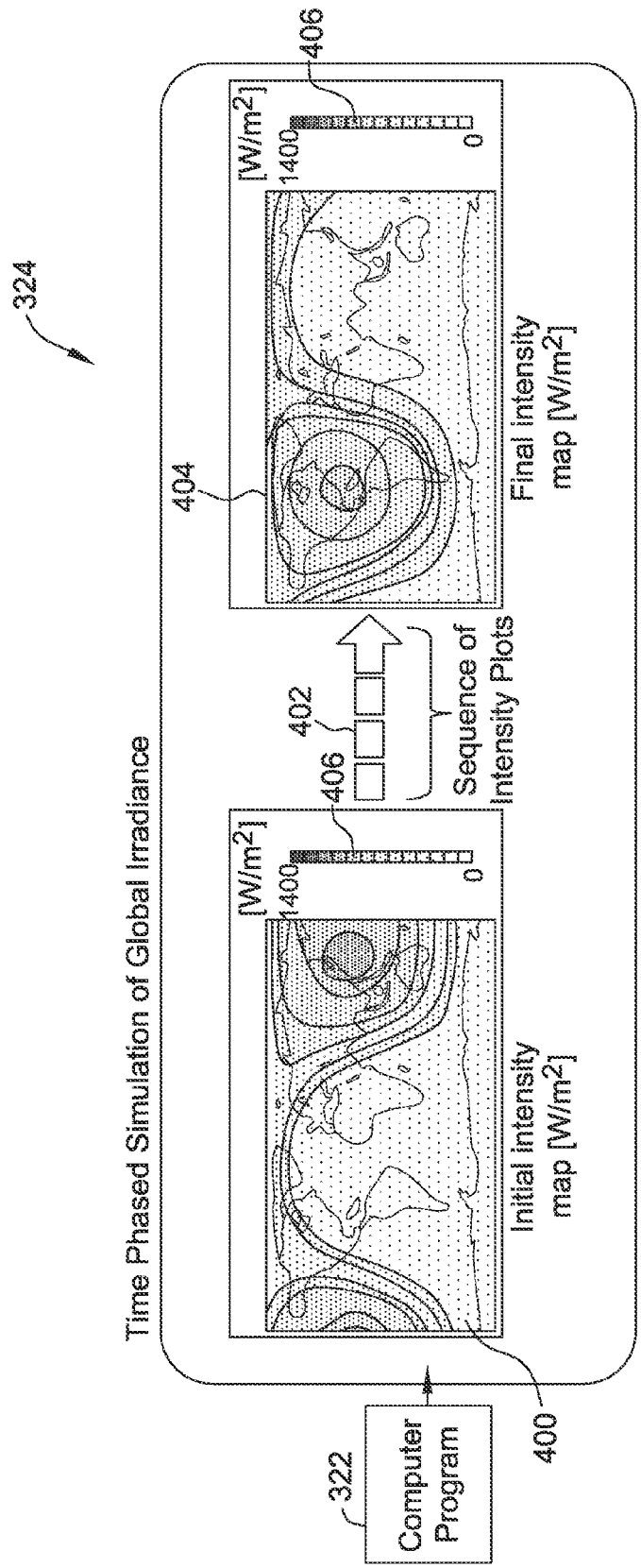
FIG. 4 is a block diagram of example output from the computing device of FIG. 2 based on calculating the amount of solar irradiance over the predetermined time period for the geographical area.

FIG. 4 is a block diagram of example output from computing device 200 based on calculating the amount of solar irradiance 106 over the predetermined time period for geographical area 102. More specifically, and as described above, computing device 200, executing computer program 322, generates time-phased simulation 324, which includes a plurality of intensity maps 400, 402, and 404. More specifically, computing device 200 generates first intensity map 400, which pertains to the beginning of the predetermined time period. Additionally computing device 200 generates final intensity map 404, which pertains to the end of the predetermined time period. Further, computing device generates at least one intermediate intensity map 402 that pertains to at least one time interval (e.g. an hour, a minute, a second, or other unit of time) between the beginning of the predetermined time period and the end of the predetermined time period. In some implementations, computing device 200 causes first intensity map 400, at least one intermediate intensity map 402, and final intensity map 404 to be displayed in a chronological sequence, for example as an animation.

In some implementations, first intensity map 400 may include a graphical representation of geographical area 102 that is coded with colors, shades of gray, patterns, or other indicia that represents an intensity (e.g., Watts per meters squared) of solar irradiance 106 received at geographical points 104 of geographical area 102 received at the beginning of the predetermined time period. For example, first intensity map 400 may represent solar intensity over a first hour of the predetermined time period. Additionally, first intensity map 400 may include a legend 406 that identifies levels of intensity represented by the color, shades of gray, patterns, or other indicia. In such implementations, at least one intermediate intensity map 402 and final intensity map 404 include corresponding indicia and legend 406 for respective time intervals within the predetermined time period.

Figure 5:
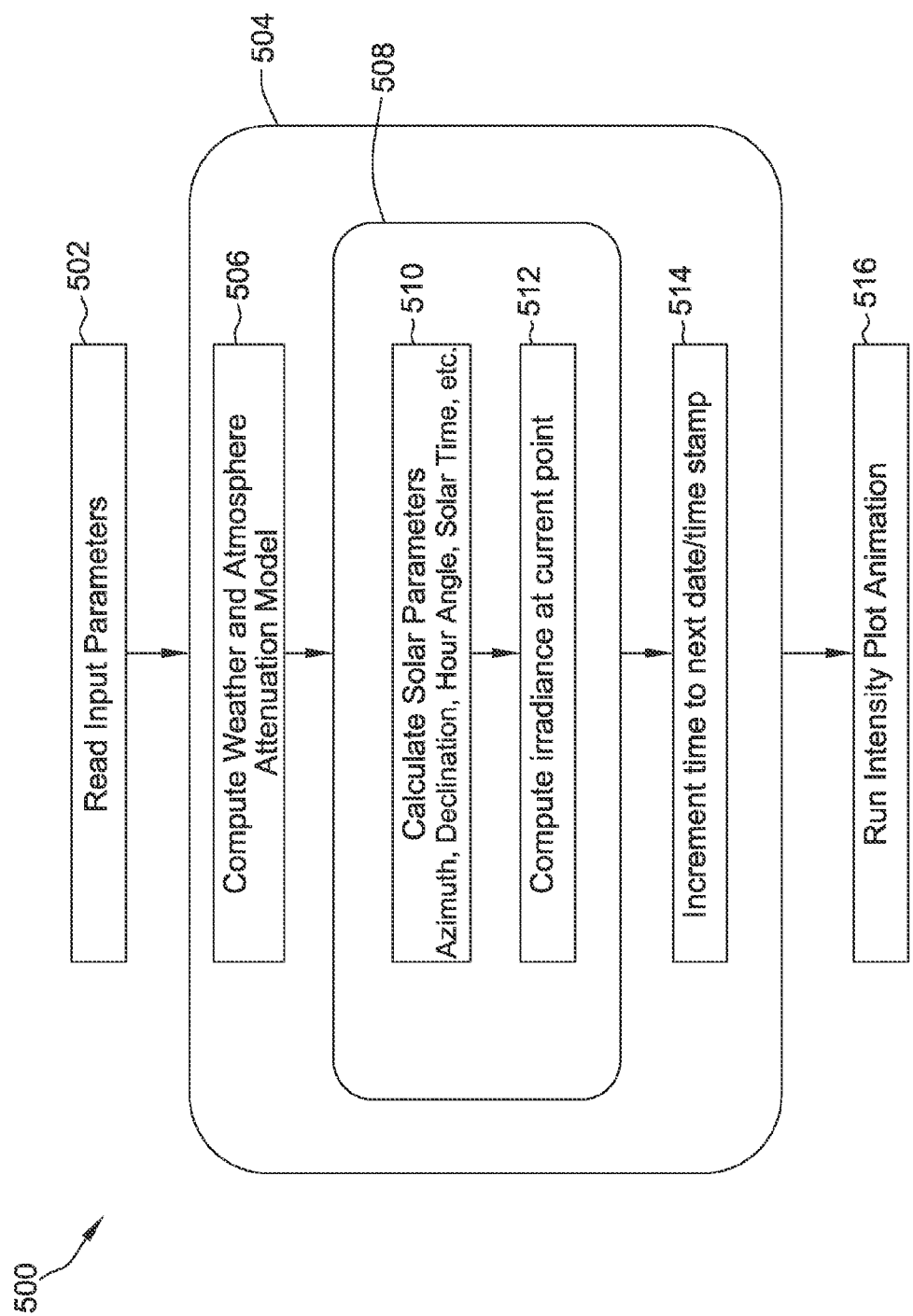
FIG. 5 is a flow chart of a process that may be performed by the computing device of FIG. 2 for calculating the amount of solar irradiance over the predetermined time period for the geographical area.

FIG. 5 is a flow chart of a process 500 that may be performed by computing device 200 for calculating the amount of solar irradiance 106 over the predetermined time period for geographical area 102. Initially, computing device 200 reads 502 or receives input parameters 302 (FIG. 3). Next, in an outer loop 504 that computing device 200 executes for each time interval or intensity map 400, 402, 404, computing device 200 computes (i.e., calculates or determines) a weather and atmosphere attenuation model (e.g., weather and atmosphere attenuation model 314). For relatively lower altitudes (i.e., below clouds), computing device 200 utilizes weather data 313 and 315, for example from weather database 312, to generate a model (e.g., weather and atmosphere attenuation model 314) for clarity conditions and diffuse light. In some implementations, computing device 200 uses probability generating function 316 to generate weather and atmosphere attenuation model 314. In other implementations, computing device 200 averages historical weather data 313 to generate weather and atmosphere attenuation model 314.

In inner loop 508, which computing device 200 executes for each geographical point 104 in geographical area 102, computing device 200 calculates 510 solar parameters including an azimuth, a declination, an hour angle, and a solar time. Additionally, computing device 200 computes 512 an irradiance or amount of solar irradiance 106 received at the geographical point 104 in view of weather and atmosphere attenuation model 314 and the solar parameters. In some implementations, computing device 200 computes an amount of solar irradiance received at a horizontal plane (not shown) associated with geographical point 104. While a certain set of solar parameters may indicate that a first amount of solar irradiance 106 will be received at geographical point 104, when computing device 200 applies weather and atmosphere attenuation model 314, the first amount of solar irradiance 106, may be reduced to a second amount, for example, due to clouds located above geographical point 104.

Returning to outer loop 504, computing device 200 increments 514 to a subsequent time interval (i.e., a date and time stamp) in the predetermined time period. Accordingly, with each iteration of outer loop 504, computing device 200 generates a complete intensity map 400, 402, 404. Additionally, computing device 200 runs 516 (e.g., displays or otherwise outputs) an intensity plot animation, for example a chronological sequence of first intensity map 400, at least one intermediate intensity map 402, and final intensity map 404.

Figure 6:
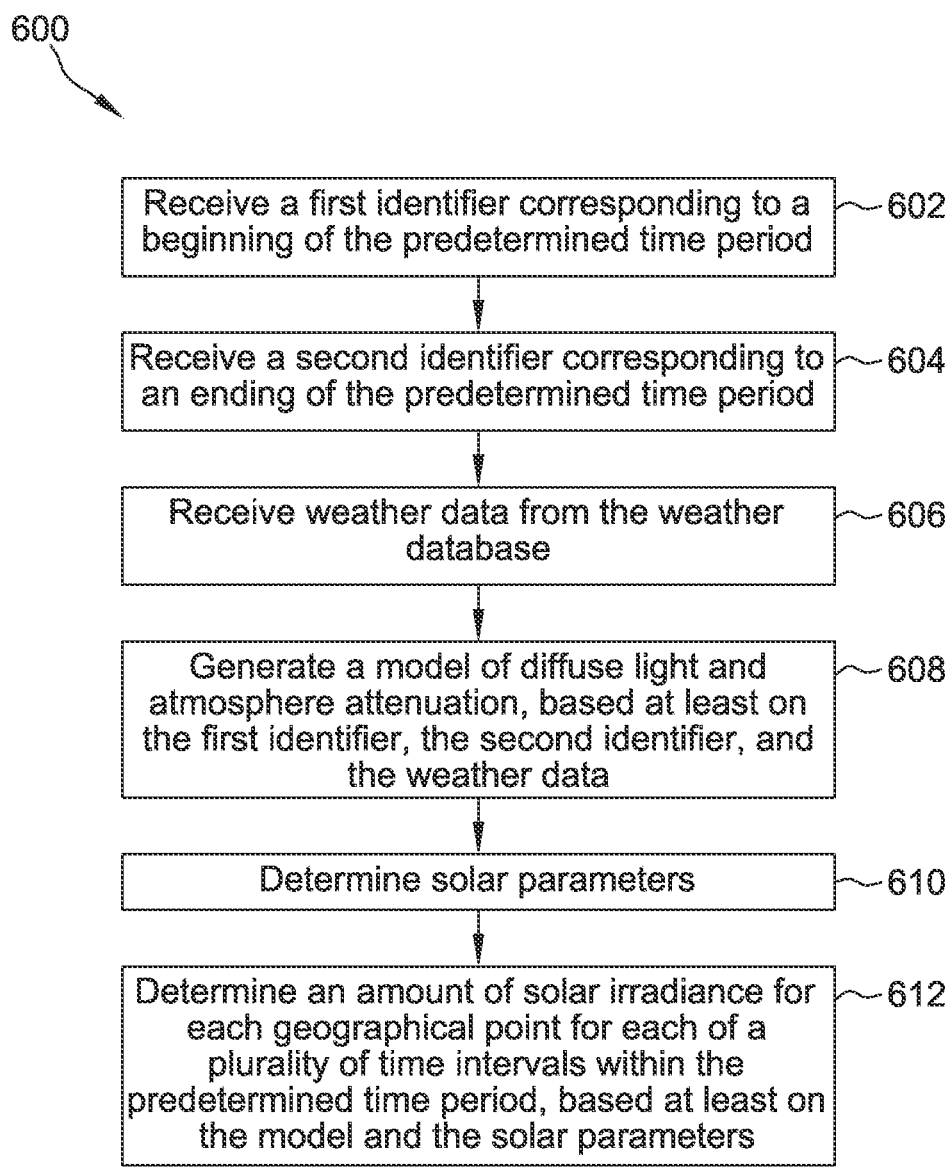
FIG. 6 is another flow chart of a process that may be performed by the computing device of FIG. 2 for calculating the amount solar irradiance over the predetermined time period for the geographical area.

FIG. 6 is another flow chart of a process 600 that may be performed by computing device 200 for calculating the amount solar irradiance received over the predetermined time period in geographical area 102. Initially, computing device 200 receives 602 first identifier 304 corresponding to a beginning of the predetermined time period. Additionally, computing device 200 receives 604 second identifier 306 corresponding to an ending of the predetermined time period. Additionally, computing device 200 receives 606 weather data, for example weather data 313 and 315, from weather database 312. Additionally, computing device 200 generates 608 a model (e.g., weather and atmosphere attenuation model 314) of diffuse light and atmospheric attenuation, based at least on first identifier 304, second identifier 306, and weather data 313 and/or 315. Additionally, computing device 200 determines 610 solar parameters, for example an azimuth, a declination, an hour angle, and a solar time. Additionally, computing device 200, determines 612 an amount of solar irradiance 106 for each geographical point 104 for each of a plurality of time intervals within the predetermined time period, based at least on the model (e.g., weather and atmosphere attenuation model 314) and the solar parameters.

In some implementations, computing device 200 additionally generates an animation of solar irradiance 106 over the predetermined time period. Additionally, in some implementations, computing device 200 receives third identifier 308 corresponding to an altitude and generates the model (e.g., weather and atmosphere attenuation model 314) based additionally on the altitude. In some implementations, computing device 200 determines an amount of solar irradiance 106 for each geographical point 104 by determining an amount of solar irradiance for each geographical point 104 of a planet (e.g., planet 101), such as the Earth. In some implementations, computing device 200 determines an average weather based on historical weather data 313 in weather database 312. In some implementations, computing device 200 determines a probability of a weather event affecting solar irradiance based on weather data (e.g., historical weather data 313 and/or current weather data 315) in weather database 312. In some implementations, computing device 200 assigns a first weight to a first set of weather data (e.g., current weather data 315) having a first age, and assigns a second weight to a second set of weather data (e.g., historical weather data 313) having a second age, wherein the first age is less than the second age, and the first weight is greater than the second weight. In other words, in computing weather and atmosphere attenuation model 314, computing device 200 may assign more weight to more recent weather data, and comparatively less weight to comparatively older weather data. In some implementations, computing device 200 estimates extraterrestrial irradiance for altitudes above the atmosphere and determines that the attenuation is zero.

A technical effect of systems and methods described herein includes at least one of: (a) receiving a first identifier corresponding to a beginning of a predetermined time period and a second identifier corresponding to an ending of the predetermined time period; (b) receiving weather data from a weather database; (c) generating a model of diffuse light and atmosphere attenuation, based at least on the first identifier, the second identifier, and the weather data; (d) determining solar parameters; and (e) determining an amount of solar irradiance for each geographical point of a plurality of geographic points in a geographical area, for each of a plurality of time intervals within the predetermined time period, based at least on the model and the solar parameters.

As compared to known methods and systems for calculating an amount of solar irradiance received at a fixed geographical point at a fixed instant in time, the methods and systems described herein facilitate calculating amounts of solar irradiation received in a geographical area that includes a plurality of geographical points, over a predetermined time period.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for calculating non-reflected solar irradiance over a predetermined time period for a geographical area including a plurality of geographical points, the method is implemented by a computing device including a processor, an input device, a communication interface, a display device, and a memory and coupled to a weather database, the method comprising:
   receiving, via the input device, a first identifier corresponding to a beginning of the predetermined time period, a second identifier corresponding to an ending of the predetermined time period, and an altitude that is an elevation above a surface of a planet;
   receiving, by the processor, historical weather data from the weather database;
   receiving, via the communication interface, current weather data from one or more weather station computing devices;
   generating, by the processor, a model of diffuse light and atmosphere attenuation for the plurality of geographic points, wherein the model is configured to determine a probability of an attenuating weather event occurring during at least a portion of the predetermined time period at each of the plurality of geographic points based on the altitude, and wherein the probability is determined from the historical weather data and the current weather data;
   determining, by the processor, solar parameters;
   determining, by the processor, an amount of non-reflected solar irradiance for each geographical point at the altitude for each of a plurality of time intervals within the predetermined time period, based at least on the probability and the solar parameters;
   generating, by the processor, an animation of the non-reflected solar irradiance over the predetermined time period; and
   outputting, on the display device of the computing device, the animation of non-reflected solar irradiance over the predetermined time period.

2. The method of claim 1, wherein determining an amount of non-reflected solar irradiance for each geographical point further comprises determining an amount of non-reflected solar irradiance for each geographical point of the Earth.

3. The method of claim 1, wherein said method further comprises determining an average weather for the predetermined time period based on the historical weather data.

4. The method of claim 1, wherein determining the solar parameters includes determining at least one of an azimuth, a declination, an hour angle, and a solar time.

5. The method of claim 1, further comprising assigning a first weight to a first set of the weather data having a first age and assigning a second weight to a second set of the weather data having a second age, wherein the first age is less than the second age and the first weight is greater than the second weight.

6. A computing device for calculating non-reflected solar irradiance over a predetermined time period for a geographical area including a plurality of geographical points, said computing device coupled to a weather database, said computing device configured to:
   receive, via an input device, a first identifier corresponding to a beginning of the predetermined time period;
   receive, via the input device, a second identifier corresponding to an ending of the predetermined time period;
   receive, via the input device, a third identifier corresponding to an altitude that is an elevation above a surface of a planet;
   receive historical weather data from the weather database;
   receive, via a communication interface, current weather data from one or more weather station computing devices;
   generate, by the processor, a model of diffuse light and atmosphere attenuation for the plurality of geographic points, wherein the model is configured to determine a probability of an attenuating weather event occurring during at least a portion of the predetermined time period at each of the plurality of geographic points based on the altitude, and wherein the probability is determined from the historical weather data and the current weather data;
   determine solar parameters;
   determine an amount of non-reflected solar irradiance for each geographical point at the altitude for each of a plurality of time intervals within the predetermined time period, based at least on the probability and the solar parameters;

generate, by the processor, an animation of the non-reflected solar irradiance over the predetermined time period; and output, on a display device of the computing device, the animation of non-reflected solar irradiance over the predetermined time period.

7. The computing device of claim 6, further configured such that determining an amount of non-reflected solar irradiance for each geographical point further comprises determining an amount of non-reflected solar irradiance for each geographical point of the Earth.

8. The computing device of claim 6, said computing device is further configured to determine an average weather for the predetermined time period based on the historical weather data.

9. The computing device of claim 6, further configured to determine the solar parameters by determining at least one of an azimuth, a declination, an hour angle, and a solar time.

10. The computing device of claim 6, further configured to assign a first weight to a first set of the weather data having a first age and assign a second weight to a second set of the weather data having a second age, wherein the first age is less than the second age and the first weight is greater than the second weight.

11. A non-transitory computer-readable storage medium having computer-executable instructions embodied thereon for calculating non-reflected solar irradiance over a predetermined time period for a geographical area including a plurality of geographical points, wherein when executed by a computing device coupled to a weather database and having at least one processor, the computer-executable instructions cause the computing device to:

receive, via an input device, a first identifier corresponding to a beginning of the predetermined time period;

receive, via the input device, a second identifier corresponding to an ending of the predetermined time period;

receive, via the input device, a third identifier corresponding to an altitude that is an elevation above a surface of a planet;

receive historical weather data from the weather database;

receive, via a communication interface, current weather data from one or more weather station computing devices;

generate, by the at least one processor, a model of diffuse light and atmosphere attenuation for the plurality of geographic points, wherein the model is configured to determine a probability of an attenuating weather event occurring during at least a portion of the predetermined time period at each of the plurality of geographic points based on the altitude, and wherein the probability is determined from the historical weather data and the current weather data;

determine solar parameters;

determine an amount of non-reflected solar irradiance for each geographical point at the altitude for each of a plurality of time intervals within the predetermined time period, based at least on the probability and the solar parameters;

generate, by the at least one processor, an animation of the non-reflected solar irradiance over the predetermined time period; and output, on a display device of the computing device, the animation of non-reflected solar irradiance over the predetermined time period.

12. The computer-readable storage medium of claim 11, wherein said computer-executable instructions further cause the computing device to determine an amount of non-reflected solar irradiance for each geographical point by determining an amount of non-reflected solar irradiance for each geographical point of the Earth.

* * * * *